US009491836B2

(12) United States Patent
Lys

(10) Patent No.: US 9,491,836 B2
(45) Date of Patent: Nov. 8, 2016

(54) METHODS AND APPARATUS FOR DETERMINING RELATIVE POSITIONS OF LED LIGHTING UNITS

(75) Inventor: Ihor Lys, Milton, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1295 days.

(21) Appl. No.: 13/000,812

(22) PCT Filed: Jun. 22, 2009

(86) PCT No.: PCT/IB2009/052674
§ 371 (c)(1),
(2), (4) Date: Dec. 22, 2010

(87) PCT Pub. No.: WO2010/004461
PCT Pub. Date: Jan. 14, 2010

(65) Prior Publication Data

US 2011/0101889 A1 May 5, 2011

Related U.S. Application Data

(60) Provisional application No. 61/079,056, filed on Jul. 8, 2008.

(51) Int. Cl.
*G05B 23/02* (2006.01)
*H05B 37/02* (2006.01)
*H05B 33/08* (2006.01)

(52) U.S. Cl.
CPC ...... *H05B 37/0254* (2013.01); *H05B 33/0803* (2013.01)

(58) Field of Classification Search
CPC ....................... H05B 37/0254; H05B 33/0803
USPC ............... 340/3.5, 3.52, 3.54, 3.7, 540, 907; 315/291, 293, 294, 295, 308, 312
See application file for complete search history.

(56) References Cited

U.S. PATENT DOCUMENTS

| | | | | | |
|---|---|---|---|---|---|
| 2,615,992 | A | * | 10/1952 | Flory et al. | 382/114 |
| 2,869,117 | A | * | 1/1959 | Berger et al. | 342/76 |
| 2,913,595 | A | * | 11/1959 | Kaufmann | 307/416 |
| 2,932,012 | A | * | 4/1960 | Jorgensen | 365/80 |
| 4,007,493 | A | * | 2/1977 | Behr et al. | 360/77.07 |
| 4,542,367 | A | * | 9/1985 | Shreve | 341/137 |
| 4,561,849 | A | * | 12/1985 | Eichweber | 434/22 |

(Continued)

FOREIGN PATENT DOCUMENTS

| | | | | | |
|---|---|---|---|---|---|
| DE | 3400056 | A1 * | 7/1985 | | G09G 3/14 |
| JP | 5003083 | A | 6/1991 | | |

(Continued)

*Primary Examiner* — Kerri McNally

(57) ABSTRACT

Methods and apparatus for determining the relative electrical positions of lighting units (202*a*, 202*b*, 202*c*, 202*d*) arranged in a linear configuration along a communication bus (204) are provided. The methods may involve addressing each lighting unit (202*a*, 202*b*, 202*c*, 202*d*) of the linear configuration once, and counting a number of detected events at the position of each lighting unit. The number of detected events may be unique to each electrical position, thus providing an indication of the relative position of a lighting unit within the linear configuration. The methods may be implemented at least in part by a controller (210) common to multiple lighting units of a lighting system, or may be implemented substantially by the lighting units (202*a*, 202*b*, 202*c*, 202*d*) themselves.

19 Claims, 4 Drawing Sheets

(56) References Cited

U.S. PATENT DOCUMENTS

| | | | | |
|---|---|---|---|---|
| 5,332,999 | A * | 7/1994 | Prati et al. | 342/25 F |
| 5,625,260 | A * | 4/1997 | Millgard | 315/136 |
| 5,652,481 | A * | 7/1997 | Johnson et al. | 315/308 |
| 5,719,899 | A * | 2/1998 | Thielecke et al. | 375/144 |
| 5,767,804 | A * | 6/1998 | Murphy | 342/357.31 |
| 5,828,178 | A * | 10/1998 | York et al. | 315/151 |
| 5,936,361 | A * | 8/1999 | Yamashita et al. | 315/308 |
| 6,016,038 | A * | 1/2000 | Mueller et al. | 315/291 |
| 6,063,129 | A * | 5/2000 | Dadd et al. | 703/7 |
| 6,084,546 | A * | 7/2000 | Wax et al. | 342/378 |
| 6,160,757 | A * | 12/2000 | Tager et al. | 367/119 |
| 6,188,181 | B1 * | 2/2001 | Sinha et al. | 315/293 |
| 6,211,626 | B1 * | 4/2001 | Lys et al. | 315/291 |
| 6,314,149 | B1 * | 11/2001 | Daffron | 375/371 |
| 6,363,121 | B1 * | 3/2002 | Hochwald et al. | 375/260 |
| 6,388,400 | B1 * | 5/2002 | Noh | 315/318 |
| 6,507,158 | B1 * | 1/2003 | Wang | 315/294 |
| 6,515,622 | B1 * | 2/2003 | Izadpanah et al. | 342/368 |
| 6,539,393 | B1 * | 3/2003 | Kabala | |
| 6,724,842 | B1 * | 4/2004 | Hochwald et al. | 375/347 |
| 6,747,420 | B2 * | 6/2004 | Barth et al. | 315/291 |
| 6,831,569 | B2 * | 12/2004 | Wang et al. | 340/9.16 |
| 6,901,971 | B2 * | 6/2005 | Speasl et al. | 141/1 |
| 7,080,061 | B2 * | 7/2006 | Kabala | |
| 7,102,538 | B2 * | 9/2006 | Chen | 340/907 |
| 7,135,824 | B2 * | 11/2006 | Lys et al. | 315/292 |
| 7,178,941 | B2 * | 2/2007 | Roberge et al. | 362/225 |
| 7,228,228 | B2 * | 6/2007 | Bartlett et al. | 701/517 |
| 7,248,167 | B2 * | 7/2007 | Wassingbo | 340/572.1 |
| 7,327,795 | B2 * | 2/2008 | Oprea | 375/260 |
| 7,327,800 | B2 * | 2/2008 | Oprea et al. | 375/267 |
| 7,440,490 | B2 * | 10/2008 | Kidiyarova-Shevchenko et al. | 375/148 |
| 7,667,408 | B2 * | 2/2010 | Melanson et al. | 315/209 R |
| 7,668,268 | B2 * | 2/2010 | Heiskala | 375/348 |
| 7,720,172 | B2 * | 5/2010 | Nakagawa et al. | 375/295 |
| 7,844,352 | B2 * | 11/2010 | Vouzis et al. | 700/44 |
| 7,988,332 | B2 * | 8/2011 | Lo et al. | 362/249.05 |
| 8,035,529 | B2 * | 10/2011 | Veskovic et al. | 315/312 |
| 8,036,286 | B2 * | 10/2011 | Lee et al. | 375/260 |
| 8,052,303 | B2 * | 11/2011 | Lo et al. | 362/249.05 |
| 8,059,733 | B2 * | 11/2011 | Khojastepour et al. | 375/260 |
| 8,076,920 | B1 * | 12/2011 | Melanson | 323/299 |
| 8,077,035 | B2 * | 12/2011 | Reid et al. | 340/565 |
| 8,093,839 | B2 * | 1/2012 | Jin et al. | 315/308 |
| 8,111,008 | B2 * | 2/2012 | Veskovic et al. | 315/291 |
| 8,144,795 | B2 * | 3/2012 | Ihm et al. | 375/267 |
| 8,148,913 | B2 * | 4/2012 | Kerr et al. | 315/291 |
| 8,155,254 | B2 * | 4/2012 | Li et al. | 375/346 |
| 8,174,204 | B2 * | 5/2012 | Melanson | 315/291 |
| 8,179,056 | B2 * | 5/2012 | Seguine | 315/291 |
| 8,188,677 | B2 * | 5/2012 | Melanson et al. | 315/291 |
| 8,232,745 | B2 * | 7/2012 | Chemel et al. | 315/308 |
| 8,264,167 | B2 * | 9/2012 | Kerr et al. | 315/291 |
| 8,264,168 | B2 * | 9/2012 | Feri et al. | 315/294 |
| 8,350,496 | B2 * | 1/2013 | Peting et al. | 315/291 |
| 8,350,497 | B2 * | 1/2013 | Peting et al. | 315/291 |
| 2003/0020595 | A1 * | 1/2003 | Wacyk | 340/3.5 |
| 2003/0057890 | A1 * | 3/2003 | Lys et al. | 315/295 |
| 2003/0117087 | A1 * | 6/2003 | Barth et al. | 315/291 |
| 2003/0191767 | A1 * | 10/2003 | Kabala | 707/100 |
| 2003/0218973 | A1 * | 11/2003 | Oprea et al. | 370/210 |
| 2003/0222603 | A1 * | 12/2003 | Mogilner et al. | 315/294 |
| 2004/0043774 | A1 * | 3/2004 | Lee | 455/456.1 |
| 2004/0101163 | A1 * | 5/2004 | Kumagai et al. | 382/103 |
| 2004/0120299 | A1 * | 6/2004 | Kidiyarova-Shevchenko et al. | 370/342 |
| 2004/0140777 | A1 * | 7/2004 | Fosler | 315/363 |
| 2004/0190636 | A1 * | 9/2004 | Oprea | 375/260 |
| 2004/0192218 | A1 * | 9/2004 | Oprea | 455/73 |
| 2004/0217718 | A1 * | 11/2004 | Kumar et al. | 315/291 |
| 2005/0062440 | A1 * | 3/2005 | Lys et al. | 315/291 |
| 2005/0179404 | A1 * | 8/2005 | Veskovic et al. | 315/291 |
| 2006/0093185 | A1 * | 5/2006 | Kato et al. | 382/103 |
| 2006/0125426 | A1 * | 6/2006 | Veskovic et al. | 315/312 |
| 2006/0189280 | A1 * | 8/2006 | Goldberg | 455/101 |
| 2006/0197474 | A1 * | 9/2006 | Olsen | 315/312 |
| 2006/0270352 | A1 * | 11/2006 | Webster et al. | 455/63.4 |
| 2007/0145915 | A1 * | 6/2007 | Roberge et al. | 315/312 |
| 2007/0184852 | A1 * | 8/2007 | Johnson et al. | 455/456.1 |
| 2007/0222685 | A1 * | 9/2007 | Kuo | 343/700 MS |
| 2007/0268981 | A1 * | 11/2007 | Heiskala | 375/267 |
| 2008/0136267 | A1 * | 6/2008 | Laabs et al. | 310/12 |
| 2008/0163363 | A1 * | 7/2008 | Mizutani | 726/19 |
| 2008/0185977 | A1 * | 8/2008 | Veskovic et al. | 315/294 |
| 2008/0317157 | A1 * | 12/2008 | Ihm et al. | 375/267 |
| 2010/0079081 | A1 * | 4/2010 | Zhang et al. | 315/291 |
| 2010/0079083 | A1 * | 4/2010 | Seguine | 315/292 |
| 2010/0158170 | A1 * | 6/2010 | Li et al. | 375/346 |
| 2011/0110450 | A1 * | 5/2011 | Gomadam et al. | 375/267 |
| 2012/0105228 | A1 * | 5/2012 | Loveland et al. | 340/540 |

FOREIGN PATENT DOCUMENTS

| | | | |
|---|---|---|---|
| JP | 11214166 | | 6/1999 |
| WO | 2006043232 | A1 | 4/2006 |
| WO | 2007031891 | A1 | 3/2007 |
| WO | WO 2007084673 | A2 * | 7/2007 |

* cited by examiner

| Lighting Unit | 202a | 202b | 202c | 202d |
|---|---|---|---|---|
| Address | 010 | 011 | 001 | 012 |
| Detected events after addressing 012 | 1 | 1 | 1 | 1 |
| Detected events after addressing 001 | 2 | 2 | 2 | 1 |
| Detected events after addressing 010 | 3 | 2 | 2 | 1 |
| Detected events after addressing 011 | 4 | 3 | 2 | 1 |

METHODS AND APPARATUS FOR DETERMINING RELATIVE POSITIONS OF LED LIGHTING UNITS

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Coordinated lighting displays can be created using addressable LED-based lighting units. An "addressable" LED-based lighting unit has a unique identifier, or address (e.g., a serial number), allowing commands or data to be sent specifically to it. Therefore, addressable LED-based lighting units in a group of LED-based lighting units can be individually controlled by sending commands to the appropriate address. If the relative positions of the addressable LED-based lighting units are known, coordinated displays can be created. Some general examples of LED-based lighting units similar to those that are described in this application may be found, for example, in U.S. Pat. Nos. 6,016,038 and 6,211,626.

FIG. 1 illustrates an example of such a lighting system employing addressable LED-based lighting units. Referring to FIG. 1, a group 100 of addressable LED-based lighting units includes four addressable LED-based lighting units, 102*a*-102*d*. The four LED-based lighting units can be coordinated to produce a display in which the four colors red, green, blue, and yellow appear from left to right. In particular, addressable LED-based lighting unit 102*a* can be controlled, by sending a command to its unique address, to turn on red. Addressable LED-based lighting unit 102*b* can be controlled, by sending a command to its unique address, to turn on green. Similarly, addressable LED-based lighting units 102*c* and 102*d* can be controlled to display blue and yellow, respectively, thus completing the desired display of the four colors red, green, blue, and yellow from left to right.

Yet, to achieve the accurate coordination of the addressable LED-based lighting units 102*a*-102*d*, it is necessary to know their relative positions. The LED-based lighting units 102*a*-102*d* cannot accurately be controlled to display the colors red, green, blue, and yellow in order from left to right if it is not known in what order the lighting units are arranged. As an example, the color blue cannot be accurately made to appear at the position third from left unless it is known which LED-based lighting unit (in this case, 102*c*) is positioned third from left, and therefore to which address the command to "TURN ON BLUE" should be sent.

One conventional technique for determining the relative positions of addressable LED-based lighting units in a group of addressable LED-based lighting units is by pre-arranging, or positioning, the lighting units in order of their addresses. Referring again to FIG. 1, the address of each of the LED-based lighting units 102*a*-102*d* (e.g., 102*b*) is generally assigned to that lighting unit before it is installed, i.e., grouped with the remaining lighting units (e.g., 102*a*, 102*c*, and 102*d*). The address can be assigned by the manufacturer when the LED-based lighting unit is made. A group of LED-based lighting units (e.g., 102*a*-102*d*) is then packaged and sent to a customer with an indication of the order in which the lighting units should be arranged, in the order of their addresses. Alternatively, a manufacturer may package and send to a customer LED-based lighting units lacking addresses, and the customer can then set the address of the unit(s) prior to installation by connecting each unit to a programming device.

A second conventional scheme for determining the relative positions of the LED-based lighting units 102*a*-102*d* involves manually identifying the position of an LED-based lighting unit after the LED-based lighting units have been arranged. Referring again to FIG. 1, the LED-based lighting units 102*a*-102*d* are installed without knowledge of the order of the addresses of the lighting units. Then, a command is sent in turn to each of the addresses of the LED-based lighting units 102*a*-102*d*. A person watches which one of the LED-based lighting units 102*a*-102*d* turns on when a particular address is sent a command, and records the address and the relative position of that LED-based lighting unit. Typically, for large installations involving lots of LED-based lighting units, multiple people are needed to complete the process. One person controls the sending of commands to each of the possible addresses of LED-based lighting units 102*a*-102*d*, and a second person is positioned to watch all the LED-based lighting units to determine which unit turns on. In large system implementations of several LED-based lighting units (e.g., disposed on a building or other architectural structure), the second person may be positioned far away from the LED-based lighting units, such as across the street, resulting in an inconvenient and time-consuming process.

SUMMARY

In view of the foregoing, Applicant has developed methods and apparatus which provide an efficient determination of the electrical positions of LED-based lighting units arranged in a linear configuration. The determination may be largely, or entirely, automated, reducing the need for human input, and may be scaled to large installations of many LED-based lighting units.

According to one aspect, in general, a method is provided including the steps of addressing each addressable LED-based lighting unit of a plurality of addressable LED-based lighting units (202*a*, 202*b*, 202*c*, 202*d*) arranged in a linear configuration on a communication bus (204) comprising a data line (206*a*, 206*b*, 206*c*), a power line (206*a*, 206*b*, 206*c*), and a ground line (206*a*, 206*b*, 206*c*), and counting, for each addressable LED-based lighting unit (202*a*, 202*b*, 202*c*, 202*d*), a number of times a change in an electrical property at least partially dependent on current occurs on the data line or the power line or the ground line in response to the addressing step. The data line and the power line may or may not be the same line.

In some embodiments of this aspect of the invention, each addressable LED-based lighting unit is disposed at a unique electrical position on the communication bus and the method may further include relating the number of times the change in the electrical property occurs for each addressable LED-based lighting unit to the electrical position of that addressable LED-based lighting unit. Also, in many embodiments, the electrical property at least partially dependent on current is one of current, power, and phase between current and a voltage.

In one embodiment, the counting step includes incrementing a counter associated with each addressable LED-based lighting unit when a change in the electrical property is detected for that LED-based lighting unit. In another embodiment, the counting step includes counting, for each addressable LED-based lighting unit, the number of times the change in the electrical property occurs on the data line.

In many embodiments, each addressable LED-based lighting unit has a first unique address, and the method further includes each addressable LED-based lighting unit assigning to itself a second unique address based on the number of times the change in the electrical property occurs for that addressable LED-based lighting unit. In one particular embodiment, each addressable LED-based lighting unit is disposed at a unique electrical position on the communication bus, and the second unique address for each addressable LED-based lighting unit identifies the electrical position of that addressable LED-based lighting unit.

In some embodiments, addressing each addressable LED-based lighting unit of the plurality of addressable LED-based lighting units is performed by a controller coupled to the plurality of addressable LED-based lighting units by the communication bus, and the method further includes each addressable LED-based lighting unit sending to the controller a count value indicating the number of times a change in the electrical property occurred for that addressable LED-based lighting unit in response to the addressing step.

In one embodiment, the addressing step includes addressing one addressable LED-based lighting unit of the plurality of addressable LED-based lighting units per cycle of a clock signal. For example, addressing each addressable LED-based lighting unit may include sending a same command to each addressable LED-based lighting unit.

According to another aspect, a method of operating a plurality of addressable LED-based lighting units (202*a*, 202*b*, 202*c*, 202*d*) arranged in a linear configuration on a communication bus (204) is provided. The method includes the steps of sending a signal to a first addressable LED-based lighting unit of the plurality of addressable LED-based lighting units (202*a*, 202*b*, 202*c*, 202*d*), and monitoring, at an electrical position of each of the plurality of LED-based lighting units, an electrical property of the communication bus at least partially dependent on current for a change in current resulting from the first addressable LED-based lighting unit responding to the signal. The signal could be a command instructing the first addressable LED-based lighting unit to perform a function.

In some embodiments, the step of monitoring an electrical property includes monitoring one of current, power, and a phase between current and a voltage on the communication bus. Also, in various embodiments, the method further includes counting a number of times the change in the electrical property occurs at the electrical position of each addressable LED-based lighting unit.

According to another aspect, an apparatus is provided comprising at least one addressable LED (202*a*, 202*b*, 202*c*, 202*d*) for receiving a signal from a communication bus (204). The apparatus further comprises a sensor (208*a*, 208*b*, 208*c*, 208*d*) for monitoring, at an electrical position of the at least one addressable LED, an electrical property of the communication bus at least partially dependent on current. The apparatus further comprises a counter (210*a*, 210*b*, 210*c*, 210*d*) coupled to the sensor (208*a*, 208*b*, 208*c*, 208*d*) for counting a number of times the sensor detects a change in the electrical property of the communication bus (204). The sensor could be an ammeter or a voltmeter. Also, the at least one addressable LED and the counter may form at least part of an addressable LED-based lighting unit.

In many embodiments, the apparatus further includes digital circuitry coupled to the sensor and the counter for receiving an analog signal from the sensor, converting the analog signal to a digital signal, and providing the digital signal to the counter.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figures 1, 3:
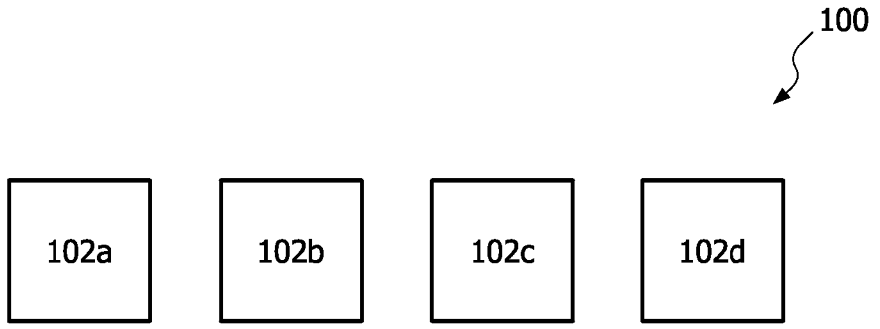
FIG. 1 PRIOR ART
FIG. 1 is a conventional lighting system including four LED-based lighting units.
FIG. 3 is a table illustrating a sequence of steps according to one method of determining relative electrical positions of addressable LED-based lighting units arranged in a linear configuration, according to one implementation of the present invention.

The conventional schemes, described above, for determining the relative positions of addressable LED-based lighting units in a group of addressable LED-based lighting units are problematic. They involve significant manual effort, time, and cost, often requiring multiple people and careful planning to successfully complete installation of the LED-based lighting units. In addition, the complexity and chance of error under the schemes increases significantly as the number of LED-based lighting units increases. A variety of systems including multiple LED-based lighting units may include hundreds, or thousands, of lighting units. Furthermore, complex LED-based lighting systems can be installed in various environments which make one or both of the conventional schemes described impractical, such as on the sides or top of tall buildings.

In appreciation of the foregoing, applicants have developed methods and apparatus for automatically determining the relative electrical positions of multiple addressable LED-based lighting units in a linear configuration of virtually any size. As used herein, the term "linear configuration" refers to multiple lighting units arranged at various nodes, or tap points, on a communication bus such that the communication bus is not broken between the lighting units. Applicants have recognized and understood that when a particular addressable LED-based lighting unit in the linear configuration is addressed and responds, that lighting unit, as well as those preceding it, will experience a change in current flowing past their respective electrical positions, while the lighting units following the addressed lighting unit will not. Therefore, if each addressable LED-based lighting unit in the linear configuration is addressed once, each addressable LED-based lighting unit will experience a unique number of changes in the electrical current. The number of changes in the electrical current may be counted for each addressable LED-based lighting unit, thus providing an indication of the relative positions of the addressable LED-based lighting units in the linear configuration, with the LED-based lighting unit closest to the beginning of the linear configuration experiencing the highest number of changes, and the LED-based lighting unit at the end of the linear configuration experiencing the lowest number of changes, typically one. The term "electrical position," as used herein, refers to the location of the node of each lighting unit on the communication bus, which may or may not correspond to the physical location of the lighting unit.

Various aspects of the present invention will now be described in greater detail. It should be appreciated that these aspects may be used alone, all together, or in any combination of two or more.

According to one aspect of the invention, a method of determining the relative electrical positions of addressable LED-based lighting units arranged in a linear configuration along a communication bus is provided. In this method, each LED-based lighting unit of a linear configuration of LED-based lighting units is addressed once. The electrical current flowing past the electrical position of each LED-based lighting unit on the communication bus is monitored while each of the LED-based lighting units is addressed. If a change in the electrical current is detected at the electrical position of an LED-based lighting unit, a counter associated with that LED-based lighting unit is incremented. After each LED-based lighting unit is addressed once, the counters associated with each LED-based lighting unit may have a unique counter value. The method may thus provide an accurate determination of the relative electrical positions of the addressable LED-based lighting units of the linear configuration, regardless of the order of the addresses of the LED-based lighting units. In addition, as will be described further below, the method may be automated.

As will be described further below, it should be appreciated that there are various alternatives for monitoring the electrical current flowing past the electrical position of each LED-based lighting unit according to the method. One alternative is to directly monitor the electrical current. However, another alternative is to monitor any electrical property that depends at least partially on current, and which may therefore exhibit a change when the electrical current changes. Examples of such electrical properties which depend at least partially on electrical current include power, voltage (e.g., if the voltage across a known resistance through which the electrical current flows is monitored), and current phase. However, it should be appreciated that other properties depending at least partially on electrical current may be monitored to detect a change in electrical current flowing past an electrical position of an LED-based lighting unit, and that the various aspects of the invention are not limited to monitoring any particular electrical property.

Thus, it should be appreciated that the electrical current flowing past an electrical position of an LED-based lighting unit may be monitored in any suitable manner, and the manner may depend on the property being monitored (e.g., electrical current, power, current phase, etc.). For example, the monitoring may be accomplished with a current meter, ammeter, voltmeter, phase detector, current transformer, hall effect sensor, series resistors, capacitors and inductors, parasitic resistances, or any suitable sensor. Furthermore, the meter/sensor may be connected or coupled to a point that is before or after the point of connection between an LED-based lighting unit and a communication bus.

Furthermore, it should be appreciated that a change in electrical current may be reported in any suitable manner. One alternative is to report the electrical current directly, for example in the embodiment in which electrical current is directly monitored. Another alternative is to convert the monitored electrical current to a voltage, for example by measuring a voltage across a known resistance through which the electrical current flows. According to this alternative, a change in the monitored electrical current may be reported as a voltage. Alternatively, in those embodiments in which electrical current is not directly monitored, but rather some electrical property depending at least partially on electrical current serves as the monitored property (e.g., power, current phase, or any other suitable electrical property), then the monitored property may be reported as a power, a current phase, or whatever property is being monitored, as opposed to being reported directly as a current. Thus, it should be appreciated, that while the electrical current flowing past an electrical position of each LED-based lighting unit is monitored, the actual property monitored and/or reported need not be current, but rather may take any suitable form.

Figure 2:
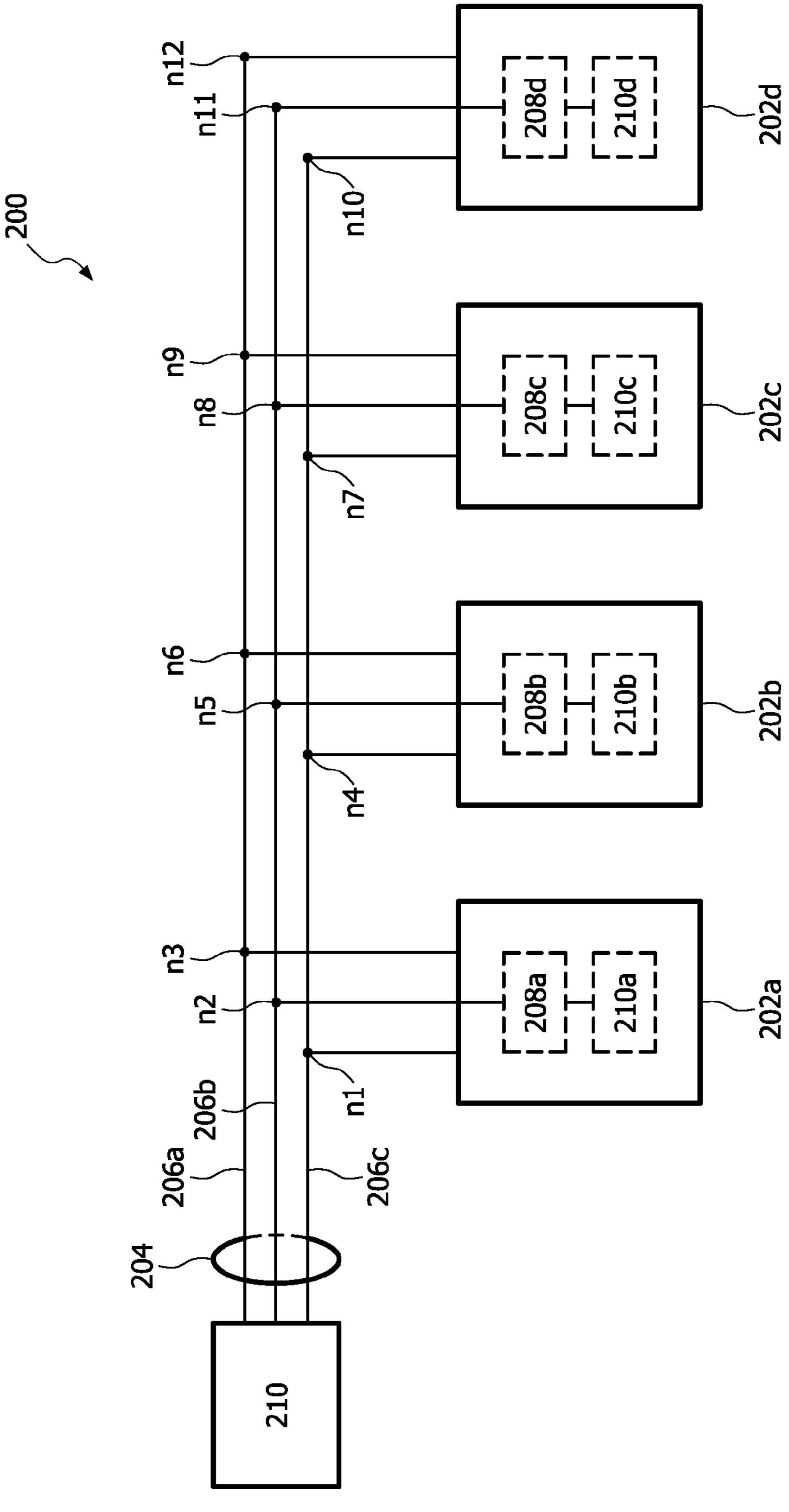
FIG. 2 is a lighting system including addressable LED-based lighting units arranged in a linear configuration, according to one implementation of the present invention.

FIG. 2 illustrates a lighting system 200 including a linear configuration of addressable LED-based lighting units to which the method of determining the relative electrical positions of the lighting units may be applied, according to one embodiment of the invention. The lighting system 200 comprises four addressable LED-based lighting units, 202*a*-202*d*. It should be appreciated that the lighting system may include any number of LED-based lighting units (including tens, hundreds, or even thousands), and that only four LED-based lighting units are illustrated in FIG. 2 for purposes of illustration. A controller 210 controls the four LED-based lighting units, and is coupled to each of the LED-based lighting units by a communication bus 204. In the non-limiting example of FIG. 2, the communication bus 204 includes three lines: a power line, a data line, and ground line, labeled as 206*a*, 206*b*, and 206*c*.

It should be appreciated that the communication bus 204 could include any number of lines, such as two lines, three lines, or any other number, and that the three lines illustrated in FIG. 2 are for purposes of illustration only. For example, a single line may be used to transmit both power and data, thus reducing the number of lines in the communication bus to two. In addition, the types of signals carried on the lines of communication bus 204 can be different from those listed. For example, while the three lines are described herein as being power, data, and ground lines, it should be appreciated that other, or additional, types of information may be carried on the communication bus 204, as the various aspects of the invention are not limited in this respect. Moreover, it should be appreciated that any of the lines 206*a*, 206*b*, and 206*c* may correspond to the power, data, and ground lines, as will be described in greater detail below.

The LED-based lighting units 202*a*-202*d* are arranged in a linear configuration along communication bus 204. As shown, they each are connected to the same power, data, and ground lines 206*a*, 206*b*, and 206*c* at various points, or nodes. For example, LED-based lighting unit is connected to line 206*c* at node $n_1$, line 206*b* at node $n_2$, and line 206*a* at node $n_3$. Similarly, LED-based lighting unit 202*b* is connected to line 206*c* at node $n_4$, line 206*b* at node $n_5$, and line 206*a* at node $n_6$. LED-based lighting unit 202*c* is connected to line 206*c* at node $n_7$, line 206*b* at node $n_8$, and line 206*a* at node $n_9$. LED-based lighting unit 202*d* is connected to line 206*c* at node $n_{10}$, line 206*b* at node $n_{11}$, and line 206*a* at node $n_{12}$.

The term "node" as used in the context of the linear configurations described herein refers to electrical connection points, and is not limited to any particular physical structure. Thus, it should be appreciated that "nodes" $n_1$-$n_{12}$ may take any suitable form, such as a tap point, and do not require the meeting of two or more wires. For example, the last LED-lighting unit (e.g., 202*d* in this case) may receive lines 206*a*, 206*b*, and 206*c* directly, such that nodes $n_{10}$-$n_{12}$ may not represent any physical structure.

As mentioned previously, the term "linear configuration" as used herein does not require that the LED-based lighting units be physically disposed in a line. For example, LED-based lighting unit 202*a* may be physically located between LED-based lighting units 202*b* and 202*c*, while it is connected to lines 206*a*, 206*b*, and 206*c* as shown in FIG. 2, i.e., electrically closest to controller 210. The methods described herein relate to determination of the electrical positions (i.e., the positions of nodes $n_1$-$n_{12}$) of the LED-based lighting units, and may or may not provide information about the physical locations of LED-based lighting units 202*a*-202*d*.

According to the method of determining the relative electrical positions of the LED-based lighting units of a linear configuration described above, each of the LED-based lighting units 202*a*-202*d* is addressed once using its unique address, for example with a command instructing the addressed lighting unit. The system 200 includes four sensors 208*a*-208*d*, one being associated with each LED-based lighting unit. The sensors 208*a*-208*b* monitor electrical current (either directly or indirectly, as described previously) on the communication bus 204, for example by monitoring a line of the communication bus. In the non-limiting example of FIG. 2, the sensors 208*a*-208*d* monitor line 206*b* at the input of the LED-based lighting unit to which the sensors correspond.

When a given LED-based lighting unit is addressed and responds to being addressed (e.g., responds to a command), the electrical current on line 206*b* may change for that lighting unit, as well as for the lighting units configured electrically between the controller and the addressed lighting unit. Thus, the LED-based lighting units positioned electrically before the addressed LED-based lighting unit will see a different current flowing past their respective electrical positions than will the LED-based lighting units positioned electrically after the addressed LED-based lighting unit. The sensors corresponding to the lighting units for which the change in current occurs may sense, or detect, the change, which change may be referred to as an "event." Counters 210*a*-210*d*, coupled to sensors 208*a*-208*d*, respectively, may count the number of changes sensed by the sensor 208*a*-208*d* corresponding to that LED-based lighting unit.

It should be appreciated that the block-diagram representation of sensors 208*a*-208*d* is primarily for purposes of illustration, and that the actual positioning of the sensors 208*a*-208*d* may be adjusted as needed to be capable of detecting changes on the line 206*b* when a particular one or more of the LED-based lighting units respond(s) to being addressed. For example, sensors 208*a*-208*d* are illustrated as being located between the nodes $n_2$, $n_5$, $n_8$, and $n_{11}$, and the respective counters 210*a*-210*d*. However, depending on the physical structure of the nodes $n_1$-$n_{12}$ and the property being monitored (e.g., current, power, phase, etc.), the sensors may positioned before or after the nodes so as to ensure the sensors can detect a change on line 206*b* when a particular one or more of the LED-based lighting units responds to being addressed.

The changes sensed by sensors 208*a*-208*d* may be counted in any suitable manner. For example, the sensors 208*a*-208*d* may produce output signals which may be digitized (e.g., a logical 1 (a HIGH) or a logical 0 (a LOW)), for example by digital circuitry such as that shown and described below in connection with FIGS. 4A-4B. The counters 210*a*-210*d* may count the number of times its corresponding sensor goes HIGH, for example. It should be appreciated that other methods of quantifying and counting the changes detected by sensors 208*a*-208*d* are also possible, and the methods described herein are not limited to any particular manner of doing so.

Also, it should be appreciated that detecting, or sensing, the change in electrical current (whether electrical current is monitored directly or by monitoring some other electrical property at least partially dependent on current) may involve some amount of signal processing. For example, digital and/or analog means for detecting the change in current may be used, such as using multiple trials, averaging techniques, noise reduction techniques, or any other suitable techniques for providing a desired precision in the detected property.

One example of the operation of the method described is given in relation to FIG. 3. As shown in the table of FIG. 3, LED-based lighting units 202*a*-202*d* may each have a unique address. In this non-limiting example, LED-based lighting unit 202*a* has address 010, LED-based lighting unit 202*b* has address 011, LED-based lighting unit 202*c* has address 001, and LED-based lighting unit 202*d* has address 012. It should be appreciated that the addresses listed, and their forms, are merely examples. Other types of addresses could also be used to uniquely identify the LED-based lighting units, and the methods described herein are not limited to use with any types of addresses for the LED-based lighting units.

After installation of the LED-based lighting units in system 200, their addresses may be known, while the relative electrical positions of the lighting units may not. For example, a user, or the controller 210, may know that the system 200 includes addresses 010, 011, 001, and 012, but may not know in what order those addresses are arranged in the linear configuration of system 200. Moreover, the user, or controller, may not know which addresses (and therefore LED-lighting units) are installed in the system 200. For example, the user, or controller, may have a list of ten (or any other number) of addresses, of which the four addresses of LED-lighting units 202*a*-202*d* are a subset. Furthermore, the user, or controller 210, may not know how many LED-based lighting units are in the system 200.

According to the method, each LED-based lighting unit 202*a*-202*d* is then addressed, for example by the controller 210. Prior to addressing the LED-based lighting units, the values of counters 210*a*-210*d* may be cleared (e.g., reset to zero), or initiated at some known value. As shown in FIG. 3, address 012 may then be addressed first. Because address 012 corresponds to LED-based lighting unit 202*d*, each of the sensors 208*a*-208*d* of the LED-based lighting units 202*a*-202*d*, respectively, may detect a change in the current of line 206*b*, such that each of the counters 210*a*-210*d* changes state (e.g., is incremented to a value of 1). Next, address 001 may be addressed. Because address 001 corresponds to LED-based lighting unit 202*c*, the sensors 208*a*-208*c* may each detect a change in the current of line 206*b* being monitored, such that the counters 210*a*-210*c* each increment to a value of 2.

Next, address 010 may be addressed. Because address 010 corresponds to LED-based lighting unit 202*a*, which is positioned electrically closest to the controller on the communication bus 204, only sensor 208*a* will detect a change in the current of line 206*b*, and therefore only counter 210*a* will increment to a value of 3. Next, address 011 may be addressed. Because address 011 corresponds to LED-based lighting unit 202*b*, sensors 208*a* and 208*b* may sense a change in the current of line 206*b*, and counters 210*a* and 210*b* may therefore increment by a value of one, producing a final result in which a unique number of events is detected by each of the addressable LED-based lighting units, i.e., in this case 4-3-2-1.

Thus, after each of the LED-based lighting units has been addressed once, the count values of counters 210*a*-210*d* may represent the order of the electrical positions of the LED-based lighting units. This information may be used, for example to create a mapping between electrical position of the LED-based lighting units and their unique addresses. The addressable LED-based lighting units may then be controlled to create lighting effects, for example by software programs written in terms of the relative electrical positions of the LED-based lighting units.

According to the method described, any suitable property may be monitored by the sensors 208*a*-208*d* to detect a change in electrical current, if the property depends at least partially on current and therefore exhibits a change when current changes for the LED-based lighting unit addressed and those preceding it in the linear configuration, but not for the LED-based lighting units following the lighting unit addressed. Examples of suitable properties or quantities to be monitored may include current, power, voltage, and current phase, although the method is not limited to these. In addition, while only a single property (e.g., current or voltage) may be monitored by each sensor in some embodiments, other embodiments may involve monitoring two or more properties, such as monitoring both current and voltage to determine power, or any other suitable properties. In some scenarios, the two or more monitored properties may be processed to produce a desired quantity.

In addition, it should be appreciated that the sensors 208*a*-208*d* may take any suitable form, which may depend on the property being measured. For example, if the property being measured is current, the sensors 208*a*-208*d* may be ammeters. If the property being measured is voltage (e.g., by measuring the voltage across a resistor through which a current flows), the sensors 208*a*-208*d* may be voltmeters. In addition to ammeters and voltmeters, the sensors 208*a*-208*d* could alternatively be Hall Effect sensors, current transformers, power meters, or any other suitable types of sensors. In addition, in some embodiments, the sensors may be non-contact sensors, meaning no break in the line being monitored (e.g., line 206*b* in the example of FIG. 2) is needed.

In the non-limiting example of FIG. 2, the communication bus comprises data, power, and ground lines. Thus, examples of how each of these lines may serve as the line being monitored by sensors 208*a*-208*d* are now described. It should be appreciated that monitoring the data, power, and ground lines are not mutually exclusive techniques, and may be applied in any combination. Also, as mentioned, the method of determining the relative electrical positions of addressable LED-based lighting units in a linear configuration by monitoring electrical current passing the electrical positions of the addressable LED-based lighting units is not limited to monitoring changes in any particular property, as previously described.

Monitoring the Data Line

According to one implementation of the method of determining the relative electrical positions of addressable LED-based lighting units arranged in a linear configuration, the data line of a communication bus is monitored by sensors associated with the addressable LED-based lighting units for changes in electrical current. Again, reference is made to FIG. 2 for purposes of explanation.

Figure 4A:
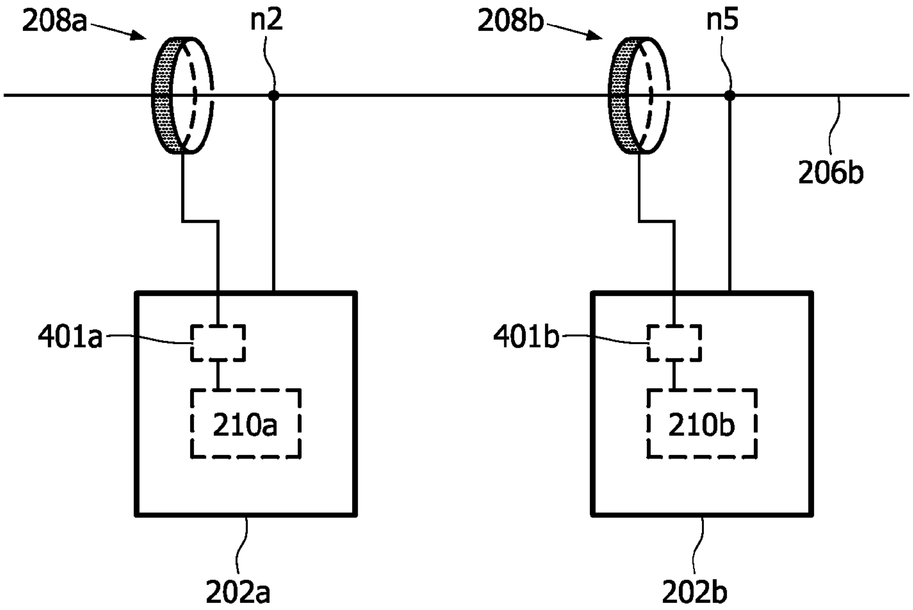
FIGS. 4A-4B are alternative arrangements of sensors for detecting changes on a line of a communication bus in a lighting system, according to one implementation of the present invention.

For purposes of this section of the present disclosure, line 206*b* is assumed to be a data line of communication bus 204, line 206*a* is assumed to be a power line of communication bus 204, and line 206*c* is assumed to be a ground line of communication bus 204. For purposes of the non-limiting example in which the data line is monitored for changes in electrical current, it is assumed that the electrical current of the data line 206*b* is directly monitored by sensors 208*a*-208*d*, although it should be appreciated that other properties, such as any of those previously described, could additionally, or alternatively, be monitored. Therefore, the sensors 208*a*-208*d* may be ammeters and therefore may not contact the line 206*b*, i.e., do not electrically break the line 206*b* to monitor it. FIG. 4A illustrates an example of one configuration of the sensors 208*a*-208*b*.

As shown, the sensors 208*a* and 208*b* surround data line 206*b*, to detect a change in current on data line 206*b*. Therefore, the sensors 208*a* and 208*b* are not positioned after nodes $n_2$ and $n_5$, but rather before them, around data line 206*b*, to detect a change in current on data line 206*c* when preceding LED-based lighting units, or the LED-based lighting unit with which the sensors are associated, is/are addressed. The sensors 208*a* and 208*b* are coupled to digital circuits 401*a* and 401*b*, respectively, which provide a digital output to counters 210*a* and 210*b*, respectively. The digital circuits may be analog-to-digital converters (A/D converters) or any other suitable circuit for converting an analog signal to a digital signal. Also, the digital circuits are optional, as some embodiments of the invention involve the sensors 208*a* and 208*b* providing analog signals directly to a suitable counter. The digital circuits 401*a*-401*b*, and the counters 210*a*-210*b* may be part of LED-based lighting units 202*a* and 202*b*, respectively, or may be distinct from the LED-based lighting units.

The current sensors 208*a*-208*d*, in this non-limiting example ammeters, may produce output signals which may be digitized as logical 1's and 0's by digital circuits 401*a* and 401*b*. The counters 210*a*-210*d* may count the number of times that the sensors 208*a*-208*d* produce a given signal, such as a logical 1, or the number of times a change in the logical state of the output from digital circuits 401*a* and 401*b* occurs.

As described previously, the method of determining the relative electrical positions of addressable LED-based lighting units arranged in a linear configuration may involve addressing each of the addressable LED-based lighting units once. The addressing protocol may comprise sending a command along the data line 206*b* to individually turn on each of the lighting units, or may be any other suitable command which may result in a change on data line 206*b*, such as a change in current. Upon receiving the "turn on" command, the lighting unit addressed may respond in a manner which causes a change on at least a portion of the data line 206*b*. For example, the addressed lighting unit may respond in a manner which draws current on the data line 206*b*. The sensor associated with the addressed LED-based lighting unit may detect the current draw, and the associated counter to which the sensor is coupled may record the change, or event, by changing state, i.e., incrementing or decrementing.

Similarly, the sensors (in this example, ammeters) of the LED-based lighting units configured between controller 210 and the LED-based lighting unit addressed will also detect the change in current resulting from the response of the addressed lighting unit. Therefore, the counters associated with these sensors may also record the change, or event, by changing state. The method may thus be performed as described in connection with the example of FIG. 3 until each LED-based lighting unit has been addressed.

Figure 4B:
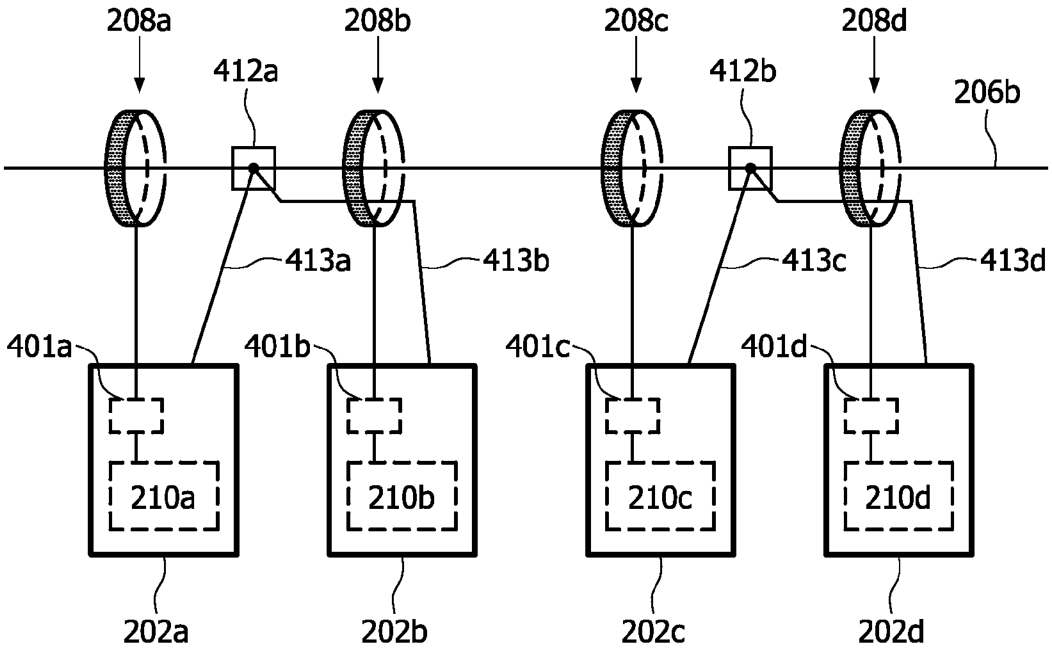

FIG. 4B illustrates an alternative configuration for the sensors 208*a*-208*d*. In FIG. 4B, pairs of LED-based lighting units share a tap connection to the data line 206*b*. The first pair of LED-based lighting units includes lighting unit 202*a* and 202*b*, which share a tap connection 412*a* via input lines 413*a* and 413*b*. Sensor 208*a*, which again is an ammeter in this non-limiting example, surrounds only data line 206*b*. However, sensor 208*b* surrounds both the data line 206*b* and input line 413*b*. Sensor 208*b* surrounds data line 206*b* to sense a change in current on line 206*b* when any LED-based lighting units positioned after it (e.g., lighting units 202*c* and 202*d* in this example) are addressed. Sensor 208*b* surrounds input line 413*b* to sense a change in current on data line 206*b* when LED-based lighting unit 202*b* is addressed.

Similarly, LED-based lighting units 202*c* and 202*d* share a tap connection 412*b*, via input lines 413*c* and 413*d*. Sensor 208*c* surrounds only data line 206*b*, while sensor 208*d* surrounds data line 206*b* and input line 413*d*.

The outputs of sensors 208*a*-208*d* may be coupled to provide an analog signal to digital circuits 401*a*-401*d*, respectively. The digital circuits may digitize the sensors outputs and provide a digital signal to counters 210*a*-210*d*, which may count the number of changes of state of the digital outputs, or the number of occurrences of a particular digital state (e.g., the number of occurrences of a logical 1).

Monitoring the Power Line

The power line of communication bus 204 may be monitored by a sensor as an alternative to, or in addition to, monitoring the data line. As with monitoring the data line, the power line may be monitored for a change any suitable electrical property indicative of a change in current, such as current, power, or any other quantity, when an LED-based lighting unit responds to a command.

For purposes of this section of the present disclosure, line 206*b* in FIG. 2 is assumed to be a power line providing a power signal to the addressable LED-based lighting units 202*a*-202*d*. Line 206*a* is assumed to be a data line, and line 206*c* is assumed to be a ground line.

In the implementation in which the power line of communication bus 204 is monitored for changes when the addressable LED-based lighting units are addressed and respond to being addressed, it may be desirable to monitor both the current and the voltage of the power line. By monitoring both the current and the voltage, the power on the power line may be monitored, such that a change in the power on the power line may be counted by the counters 210*a*-210*d*. Monitoring the power on power line 206*b*, as opposed to only the voltage or current, may provide a more accurate measurement of when a change associated with an LED-based lighting unit response occurs. To monitor multiple quantities on the power line (e.g., both current and voltage), sensors 208*a*-208*d* may each include multiple sensors (e.g., a voltmeter and an ammeter suitably arranged to measure the voltage and current of the power line). It should be appreciated that the connections of the voltmeters and ammeters to the communication bus may be different, to enable each to function properly. Therefore, it should be appreciated that the block diagram representation of the 208*a*-208*d* merely provide an example, and the actual connection of the sensor(s) may differ depending on the type of sensor(s) involved.

The power on power line 206*b* may be monitored in one or more of multiple ways. In one implementation, the voltage may be monitored (the power line need not be broken for this since the power line is providing a voltage), and the current on the power line may be monitored. The power may then be calculated using the equation $P=IV$, where P is the power, I is the current, and V is the voltage. Alternatively, the current on the power line may be monitored, as well as the phase between the current and the voltage, without directly measuring the voltage. In this implementation, the power may be determined by multiplying the in-phase current by the voltage of the power line. The phase of the voltage may be monitored using a zero crossing of the voltage, or any other suitable technique.

Monitoring the Ground Line

As an alternative, or in addition to, monitoring the data and/or power lines of communication bus 204, the ground line may be monitored to detect a change in electrical current resulting from an LED-based lighting unit responding to a command. The monitoring of the ground line may be performed in the same manner(s) in which the power line may be monitored, as previously described.

Utilization of the Counter Values

The methods described for determining the relative electrical positions of addressable LED-based lighting units arranged in a linear configuration may be performed in various manners, with differing degrees of the method being performed by various components within a lighting system. In addition, the resulting counter values obtained according to various aspects of the invention may be used in different ways, and the methods described are not limited to any particular implementation, or to any manner of using the resulting data.

According to one aspect of the invention, a controller in a lighting system performs at least a part of a method of determining the relative positions of LED-based lighting units arranged in a linear configuration. The controller may address, or send commands to, the LED-based lighting units. As described above, each LED-based lighting unit of the linear configuration may be addressed once, and therefore may respond to a command once. A counter associated with each LED-based lighting unit may detect a number of changes in current. According to one implementation, the counter values can be sent to the controller, for example along a data line of a communication bus connecting the controller to the LED-based lighting units. The counter values may be sent at the end of the addressing protocol, i.e., after each LED-based lighting unit has been addressed once, may be sent at periodic intervals during the protocol, or at any other suitable time(s).

The controller may create a "map" between the addresses of the LED-based lighting units and their relative electrical positions based on the counter values received from each of the counters associated with the LED-based lighting units. For example, referring to the previously described scenario in which a given counter is incremented upon detected of an "event," the number of counts recorded by each of the counters may represent in descending order the relative electrical positions of the LED-based lighting units in the linear configuration, with, for example, the highest number of counts corresponding to the LED-based lighting unit closest to the controller, and the lowest number of counts corresponding to the LED-based lighting unit furthest from the controller. The controller may therefore store data that indicates the relationship between an address of one of the LED-based lighting units and its relative electrical position from the controller. The LED-based lighting units may then be controlled to, for example, produce lighting effects by writing software in terms of the relative electrical positions of the LED-based lighting units from the controller.

According to one alternative, a substantial portion of the method of determining the relative electrical positions of LED-based lighting units configured in a linear configuration may be performed by the LED-based lighting units themselves. This implementation may be referred to as a "self-addressing" scheme, or an "auto-addressing" scheme.

In the auto-addressing scheme, each LED-based lighting unit may monitor two types of events. The first type of event may be detectable by each LED-based lighting unit (or a sensor associated with each unit), regardless of the unit's electrical position within the linear configuration. The second type of event may be detectable only by the LED-based lighting unit (or a sensor associated therewith) which performs a particular function, such as turning on, and those units prior to it in the linear configuration. Thus, the first type of event, which again may occur each time an LED-based lighting unit performs a designated function, may provide an indication of the total number of units in the linear configuration. After all the LED-based lighting units have performed the designated function, such as turning on, each unit may have detected a same number of the first type of event. By contrast, each unit may detect a unique number of occurrences of the second type of event.

The number of occurrences of the first type of event can be processed in combination with the number of occurrences of the second type of event at the location of each LED-based lighting unit to provide an indication of the relative electrical position of the unit. Again, the number of occurrences of the first type of event may provide an indication of the total number of lighting units, since each unit may trigger an event of the first type once during the auto-addressing scheme. Each LED-based lighting unit may then subtract the number of occurrences of the second type of event which it detected from the number of occurrences of the first type of event, providing an indication of its position within the linear configuration.

Figure 5:
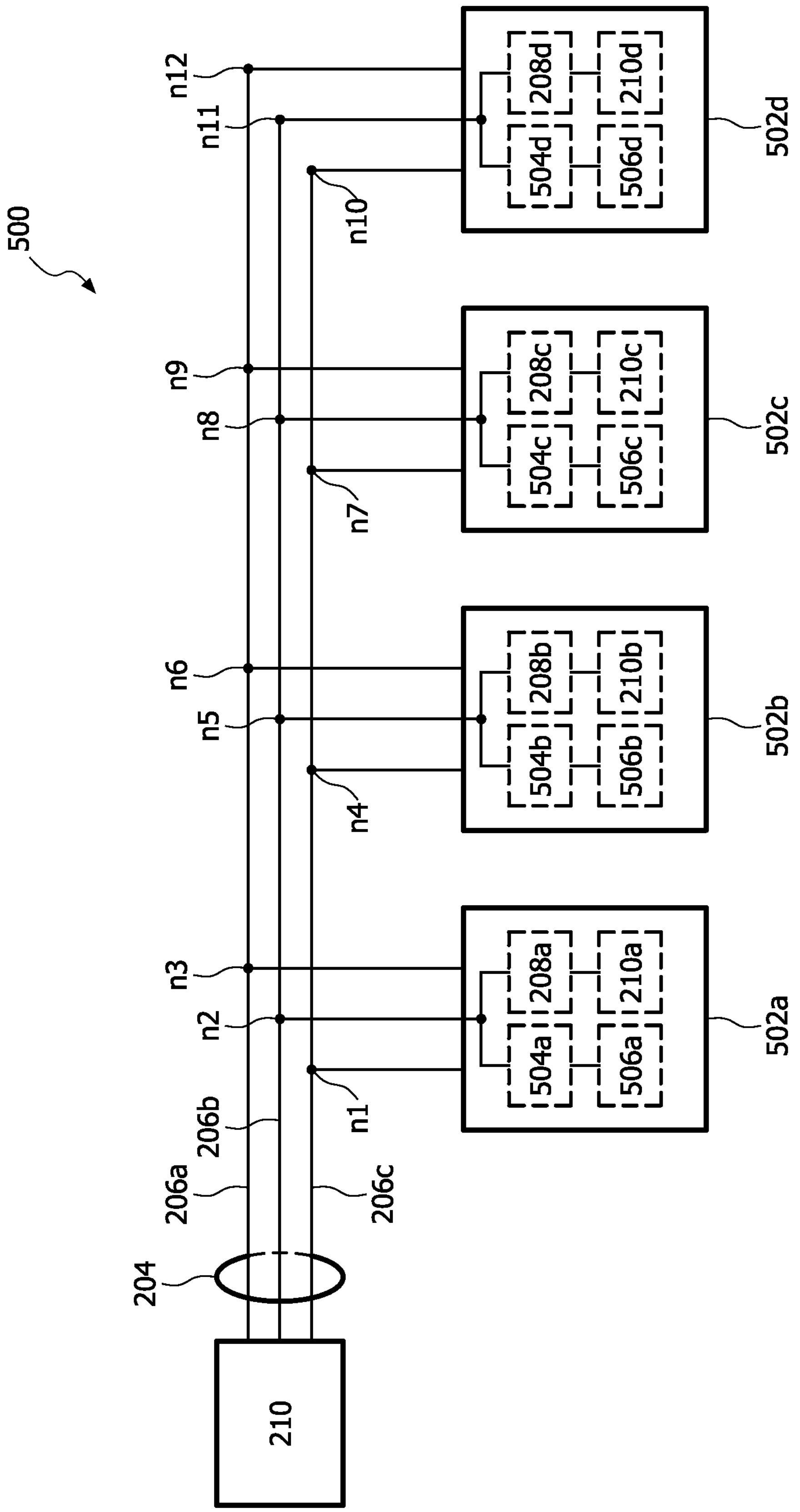
FIG. 5 is a lighting system including addressable LED-based lighting units arranged in a linear configuration and having control circuitry, according to one implementation of the present invention.

The auto-addressing scheme may be described in connection with FIG. 5, which is a variation on the lighting system of FIG. 2. In FIG. 5, the LED-based lighting units 502*a*-502*d* each include control circuitry 504*a*-504*d*, respectively, and timers 506*a*-506*d* coupled to the control circuitry. The timers may provide timing functionality for the lighting units, and may each be clocked by a reference clock. For example, the reference clock may be extracted from the power line of communication bus 204 (e.g., a 60 Hz clock), may be provided by an oscillator associated with each of the LED-based lighting units, or may be provided in any other suitable manner. It should be appreciated that any electrical property may be used to synchronize the operation of the LED-based lighting units, such as a voltage of a power line, a current, or any other suitable property.

The controller 210 may send a command to all of the LED-based lighting units 202*a*-202*d* to perform the auto-addressing scheme. In response to the command, the timers 506*a*-506*d* may be cleared, or reset, thus providing a common timing starting point. Because the timers 506*a*-506*d* may be clocked by reference signals having the same frequency (e.g., the frequency of the power line), the timers may keep the same time. After a given time, such as one clock cycle, five clock cycles, or any other suitable time, the control circuitry of the LED-based lighting unit having the lowest address (e.g., LED-based lighting unit 502*b*) may perform a function, such as turning on. The function may result in the LED-based lighting unit pulling the voltage on the line 206*b* (assumed to be a data line in this non-limiting example) low, which may be detected by the sensor 208*a*-208*d* of each of the lighting units. Thus, the sensors 208*a*-208*d* may include voltage sensors, such as a voltmeter, in this non-limiting example. For example, each sensor may include a comparator to detect when a voltage drop has occurred.

In addition to detecting the change in voltage resulting from LED-based lighting unit 502*b* turning on, the sensors 208*a* and 208*b* may also detect a change in current on line 206*b*. For example, sensors 208*a*-208*d* may include current sensors, such as ammeters. When LED-based lighting unit 502*b* turns on, only sensors 208*a* and 208*b* will detect a change in current on line 206*b*, while sensors 208*c* and 208*d* will not.

The counters 210*a*-210*d* may be configured to count both the number of voltage changes as well as the number of changes in current. For example, counters 210*a*-210*d* may each include two counters. One counter may change state (e.g., increment) for each detected voltage change, while the other counter may change state (e.g., increment) for each detected current change.

When an LED-based lighting unit detects a change in voltage, which in this non-limiting example may occur when any of the LED-based lighting units 502*a*-502*d* turns on, the timer of each LED-based lighting unit may be reset. After a particular period of time has passed, for example one clock cycle, five clock cycles, or any suitable period of time, the control circuitry of the LED-lighting unit having the next highest address (e.g., LED-based lighting unit 502*d*) may cause that LED-based lighting unit to perform a particular function, such as turning on. Again, as when LED-based lighting unit 502*b* turned on, when LED-based lighting unit 502*d* turns on each of the sensors 208*a*-208*d* may detect a change in voltage on line 206*b* and the counters 210*a*-210*d* may increment. In addition, when LED-based lighting unit 502*d* turns on, the sensors 208*a*-208*d* may each detect a change in current, and the counters 210*a*-210*d* may accordingly increment with respect to the number of current changes detected.

When LED-based lighting unit 502*d* turns on, the timers in each of the LED-based lighting units may be reset, and the process may repeat itself. The process may continue until each of the LED-based lighting units in the linear configuration has turned on once, or performed any other suitable function for providing a detectable change to the sensors 208*a*-208*d*. If the total number of lighting units in the linear configuration is not known prior to performing the auto-addressing scheme, the process may continue until there are no detected events (e.g., "turn on" events) for some specified time period, such as 10 clock cycles, 100 clock cycles, or any other suitable "time out" period.

Thus, the process described may result in each of the counters 210*a*-210*d* having recorded two separate numbers. One number may correspond to the number of detected "turn on" events, which may be the same for each counter 210*a*-210*d*, and may correspond to the total number of LED-based lighting units in the linear configuration. The second number stored by each counter 210*a*-210*d* may represent the number of current changes detected by the respective sensors, 208*a*-208*d*, and may therefore be a unique number for each of the counters 210*a*-210*d*.

The two numbers stored by counters 210*a*-210*d* may be processed to provide an indication of the position of an LED-based lighting unit. For example, control circuitry 504*a* may subtract the number of current changes recorded by counter 210*a* from the number of voltage changes recorded by counter 210*a*, thus providing an indication of the relative electrical position of LED-based lighting unit 502*a* in the linear configuration, with, for example, the lowest computed value corresponding to the LED-based lighting unit electrically closest to the controller. The control circuitry 504*a* may then "assign" a new address to LED-based lighting unit 502*a* corresponding to its relative electrical position. The unique address assigned to the LED-based lighting unit at the time of its manufacture may be a first address, and the new address assigned by the LED-based lighting unit to itself as part of the auto-addressing scheme may be a second address. The second address may be used in addition to, or in place of, the LED-based lighting unit's first unique address. The control circuitry may present the second address to the outside world (i.e., the controller 210, the other lighting units, etc.) as the address by which to address that LED-based lighting unit.

The LED-based lighting units 502*a*-502*d* may, therefore, be re-addressed in order of their relative electrical positions using the second addresses. The control circuitry 504*a*-504*d* may each assign to its respective LED-based lighting unit a second address, based on the calculation of the two numbers stored by the respective counters 210*a*-210*d*, which may be presented to the controller and other LED-based lighting units as the address of that lighting unit. Accordingly, the LED-based lighting units may arrange themselves in order of their electrical positions by assigning the appropriate second addresses to themselves.

It should be appreciated that the non-limiting example of an auto-addressing scheme according to an aspect of the invention may be modified or altered in any suitable manner to achieve substantially the same functionality. For example, the two parameters detected by sensors 208*a*-208*d* may not be voltage and current, but may be any two suitable parameters in which one of the parameters may be detected by all of the sensors 208*a*-208*d* whenever any of the LED-based lighting units 502*a*-502 performs some function, while the other parameter may only be detected by a subset of the sensors 208*a*-208*d* depending on the electrical position of the LED-based lighting unit to which the sensor belongs.

It should also be appreciated that the arrangement of components illustrated in the various figures may be re-arranged or modified in various ways. For example, the sensors and counters have been described thus far as being associated with the LED-based lighting units. The sensors and/or counters may be part of the LED-based lighting units, or may be distinct from (e.g., external to) the LED-based lighting units, as the various aspects of the invention are not limited in this respect. Similarly, it should be appreciated that the sensors may be configured in any suitable manner to detect the desired property of a line of the communication bus (e.g., current, power, etc.). For example, in some implementations the sensor may be coupled to the line of the communication bus being monitored, and a separate line may serve as an input to the LED-based light unit.

It should also be appreciated that the methods described above may provide valuable information for lighting systems having different configurations than those illustrated in FIGS. 2 and 5. For example, a lighting system may include a controller at the center of two linear configurations of LED-based lighting units. For example, referring to FIG. 2, a second set of four LED-based lighting units may be added on the other side of controller 210 from LED-based lighting units 202*a*-202*d*. Performing any of the methods describe above may provide an indication of the relative positions of each set of four LED-based lighting units within its respective "string," i.e., the relative electrical positions of LED-based lighting units 202*a*-202*d* within their string and the relative electrical positions of the additional four LED-based lighting units on the other side of controller 210. Determination of the relative positions of the two "strings" may require extra steps. However, it should be appreciated that in larger systems, for example in which a central controller has multiple strings (e.g., 3 strings, 4 strings, or more) emanating therefrom, with each string including one hundred or more LED-based lighting units, the task of determining the relative electrical positions of all of the LED-based lighting units may quickly and efficiently be reduced to a task of simply determining the relative positions of the strings, as the methods described above can be implemented to determine the relative positions of the LED-based lighting units within each string.

In some embodiments, multiple housings may each include multiple addressable LED-based lighting units. The housings may be connected to, and therefore controlled by, a same controller. Applying one or more of the methods described above as relating to various aspects of the invention may provide useful information about the relative electrical positions of the housings, for example by placing a sensor at an electrical position of each housing and monitoring a change in a suitable property (e.g., current) when LED-based lighting units of each housing are addressed and respond. Thus, according to this embodiment, only a single sensor may be required for each housing, such that the total number of sensors used to detect changes in electrical current may be reduced.

Moreover, the methods described herein may provide useful information in situations in which LED-based lighting units are arranged in a branched configuration, for example by one or more branches. Applying one or more of the methods according to various aspects of the invention may provide information about the electrical distance, as well as the electrical nearest neighbor, for each of the addressable LED-based lighting units in the branched structure. For example, if the branching network includes multiple linear sub-sections of addressable LED-based lighting units, one or more of the methods described herein may provide information about the relative ordering of the sub-sections, and may thus provide efficiency gains to the process of installing the LED-based lighting units. In such situations, the controller to which the LED-based lighting units are connected may have various capabilities, such as any of the capabilities previously discussed with respect the controllers in various embodiments. Additionally, a controller may have the capability to understand the ordering of sub-sets of LED-based lighting units within a branched configuration, thus allowing easy reconfiguration of groups of units. The controller may also provide timing functionality, and may provide the capability to process information (e.g., counting information) provided to it by the LED-based lighting units, or any other source.

In addition, it should be appreciated that any of the methods described above may be used at any point during an installation process, or after LED-based units are arranged in a linear configuration. For example, if one LED-based lighting unit goes out, and is replaced, any of the methods described above may be performed quickly to determine the relative electrical positions of any new LED-based lighting units placed in the linear configuration.

One implementation of the concepts and techniques described herein comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement one or more embodiment(s). In addition, it should be appreciated that the reference to a computer program which, when executed, performs the above-discussed functions, is not limited to an application program running on a host computer. Rather, the term computer program is used herein in a generic sense to reference any type of computer code that can be employed to program a processor to implement the above-discussed aspects of the present invention.

It should be appreciated that in accordance with various embodiments wherein processes are implemented in a computer readable medium, the computer implemented processes may, during the course of their execution, receive input manually (e.g., from a user).

Furthermore, it should be appreciated that in accordance with various embodiments, the processes described herein may be performed by at least one processor programmed to perform the process in question. A processor may be part of a server, a local computer, or any other type of processing component, as various alternatives are possible.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. Also, the reference numerals provided in the claims are non-limiting and should have no effect on the scope of the claims.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method, comprising:

A) addressing each addressable LED-based lighting unit of a plurality of addressable LED-based lighting units arranged in a linear configuration on a communication bus comprising a data line, a power line and a ground line; and B) counting, for each addressable LED-based lighting unit, a number of times a change in an electrical property at least partially dependent on current occurs on the data line or the power line or the ground line in response to A).

2. The method of claim 1, wherein each addressable LED-based lighting unit is disposed at a unique electrical position on the communication bus, and wherein the method further comprises relating the number of times the change in the electrical property occurs for each addressable LED-based lighting unit to the electrical position of that addressable LED-based lighting unit.

3. The method of claim 1, wherein the electrical property at least partially dependent on current is one of current, power, and phase between current and a voltage.

4. The method of claim 1, wherein B) comprises incrementing a counter associated with each addressable LED-based lighting unit when a change in the electrical property is detected for that LED-based lighting unit.

5. The method of claim 1, wherein each addressable LED-based lighting unit has a first unique address, and wherein the method further comprises each addressable LED-based lighting unit assigning to itself a second unique address based on the number of times the change in the electrical property occurs for that addressable LED-based lighting unit.

6. The method of claim 5, wherein each addressable LED-based lighting unit is disposed at a unique electrical position on the communication bus, and wherein the second unique address for each addressable LED-based lighting unit identifies the electrical position of that addressable LED-based lighting unit.

7. The method of claim 1, wherein B) comprises counting, for each addressable LED-based lighting unit, the number of times the change in the electrical property occurs on the data line.

8. The method of claim 1, wherein addressing each addressable LED-based lighting unit of the plurality of addressable LED-based lighting units is performed by a controller coupled to the plurality of addressable LED-based lighting units by the communication bus, and wherein the method further comprises each addressable LED-based lighting unit sending to the controller a count value indicating the number of times a change in the electrical property occurred for that addressable LED-based lighting unit in response to A).

9. The method of claim 1, wherein A) comprises addressing one addressable LED-based lighting unit of the plurality of addressable LED-based fighting units per cycle of a clock signal.

10. A method of operating a plurality of addressable LED-based lighting units arranged in a linear configuration on a communication bus, the method comprising:

A) sending a signal to a first addressable LED-based lighting unit of the plurality of addressable LED-based lighting units; and B) monitoring, at an electrical position of each of the plurality of LED-based lighting units, an electrical property of the communication bus at least partially dependent on current for a change in current resulting from the first addressable LED-based lighting unit responding to the signal.

11. The method of claim 10, wherein the signal is a command instructing the first addressable LED-based lighting unit to perform a function.

12. The method of claim 10, wherein monitoring an electrical property comprises monitoring one of current, power, and a phase between current and a voltage on the communication bus.

13. The method of claim 10, further comprising counting a number of times the change in the electrical property occurs at the electrical position of each addressable LED-based lighting unit.

14. An apparatus, comprising:

at least one addressable LED-based lighting unit for receiving a signal from a communication bus;

a sensor for monitoring, at an electrical position of the at least one addressable LED-based lighting unit, an electrical property of the communication bus at least partially dependent on current; and a counter coupled to the sensor for counting a number of times the sensor detects a change in the electrical property of the communication bus.

15. The apparatus of claim 14, wherein the sensor is an ammeter or a voltmeter.

16. The apparatus of claim 14, further comprising digital circuitry coupled to the sensor and the counter for receiving an analog signal from the sensor, converting the analog signal to a digital signal, and providing the digital signal to the counter.

17. The apparatus of claim 14, wherein the at least one addressable LED-based lighting unit comprises at least first and second LED-based lighting units connected to a common communication bus.

18. The method of claim 10, further comprising:

a controller addressing each addressable LED-based lighting unit of the plurality of addressable LED-based lighting units; and each addressable LED-based lighting unit transmitting to the controller data indicating the electrical position of that addressable LED-based lighting unit.

19. The apparatus of claim 14, further comprising a controller configured to address each addressable LED-based lighting unit of the plurality of addressable LED-based lighting units.

* * * * *